United States Patent
Tenorio et al.

(10) Patent No.: US 10,834,099 B2
(45) Date of Patent: Nov. 10, 2020

(54) IDENTIFYING A FILE USING METADATA AND DETERMINING A SECURITY CLASSIFICATION OF THE FILE BEFORE COMPLETING RECEIPT OF THE FILE

(71) Applicant: Juniper Networks, Inc., Sunnyvale, CA (US)

(72) Inventors: Yuly N. Becerra Tenorio, Concord, CA (US); Wei Han Kao, Mountain View, CA (US); Daniel J. Quinlan, San Francisco, CA (US); Volodymyr Kuznetsov, Foster City, CA (US); Yuriy Voynalovych, Foster City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 225 days.

(21) Appl. No.: 15/602,682

(22) Filed: May 23, 2017

(65) Prior Publication Data

US 2018/0343271 A1   Nov. 29, 2018

(51) Int. Cl.
*H04L 29/06* (2006.01)
*G06F 16/28* (2019.01)
(Continued)

(52) U.S. Cl.
CPC ...... *H04L 63/1408* (2013.01); *G06F 16/2255* (2019.01); *G06F 16/285* (2019.01); *G06F 21/564* (2013.01); *H04L 63/1425* (2013.01)

(58) Field of Classification Search
CPC .......... H06F 21/50; H06F 21/55; H06F 21/56; H06F 21/60; H06F 21/557;
(Continued)

(56) References Cited

U.S. PATENT DOCUMENTS

| 7,143,169 B1 * | 11/2006 | Champagne | ............ H04L 69/16 |
| | | | 709/226 |
| 8,607,066 B1 * | 12/2013 | Kailash | ................. G06F 21/564 |
| | | | 713/188 |

(Continued)

FOREIGN PATENT DOCUMENTS

| CN | 102217248 A | 10/2011 |
| CN | 106487719 A | 3/2017 |

OTHER PUBLICATIONS

Extended European Search Report for Application No. EP18164921, dated Sep. 25, 2018, 7 pages.

*Primary Examiner* — Saleh Najjar
*Assistant Examiner* — Khalid M Almaghayreh
(74) *Attorney, Agent, or Firm* — Harrity & Harrity, LLP (57) ABSTRACT

A security platform may determine, during receipt of a file, metadata associated with the file. The file may be intended for a client device. The security platform may compute, based on the metadata and during the receipt of the file, a hash associated with the file. The security platform may identify, during the receipt of the file, a stored hash that matches the hash associated with the file. The security platform may determine a security classification of the file based on information associated with a security classification corresponding to the stored hash. The security classification of the file may be determined before the receipt of the file is complete. The security platform may selectively permit, based on the security classification of the file, the client device to complete a receipt of the file.

20 Claims, 6 Drawing Sheets

(51) Int. Cl.
*G06F 16/22* (2019.01)
*G06F 21/56* (2013.01)

(58) Field of Classification Search
CPC ......... H06F 17/30598; H06F 17/30705; H06F 17/30289; H06F 17/30292; G06N 99/00; H04L 29/06; H04L 29/069; H04L 29/06918; H04L 29/06911; H04L 29/06877; H04L 29/06884; H04L 29/06904; H04L 9/0836; H04L 9/3265
USPC ......... 726/22–25; 706/12, 20, 21; 707/737, 707/747, 797, 758, 698; 713/165, 177
See application file for complete search history.

(56) References Cited

U.S. PATENT DOCUMENTS

| | | | | |
|---|---|---|---|---|
| 8,863,284 | B1* | 10/2014 | Polyakov | H04L 63/145 726/23 |
| 9,294,501 | B2* | 3/2016 | Mesdaq | H04L 63/1416 |
| 9,690,938 | B1* | 6/2017 | Saxe | G06N 3/04 |
| 9,935,973 | B2* | 4/2018 | Crofton | H04L 63/123 |
| 2003/0115485 | A1* | 6/2003 | Milliken | H04L 51/12 726/24 |
| 2004/0064737 | A1* | 4/2004 | Milliken | H04L 63/145 726/23 |
| 2004/0181687 | A1* | 9/2004 | Nachenberg | G06F 21/568 726/30 |
| 2009/0158046 | A1* | 6/2009 | Milliken | H04L 51/12 713/181 |
| 2009/0300761 | A1* | 12/2009 | Park | G06F 21/562 726/23 |
| 2012/0017275 | A1* | 1/2012 | Harmonen | G06F 21/56 726/24 |
| 2015/0096023 | A1* | 4/2015 | Mesdaq | G06F 21/566 726/23 |
| 2015/0172303 | A1* | 6/2015 | Humble | H04L 63/1408 726/23 |
| 2015/0319182 | A1* | 11/2015 | Natarajan | H04L 63/145 726/24 |
| 2017/0242870 | A1* | 8/2017 | Bshara | G06F 16/1752 |
| 2018/0255073 | A1* | 9/2018 | Sifford | G06F 16/22 |

* cited by examiner

IDENTIFYING A FILE USING METADATA AND DETERMINING A SECURITY CLASSIFICATION OF THE FILE BEFORE COMPLETING RECEIPT OF THE FILE

BACKGROUND

A security platform may provide one or more threat protection services to a client device. For example, the security platform may be configured to determine a security classification of a file, received from a server (e.g., a server associated with a website), before allowing a client device to access the file. The security platform may determine the security classification of the file using, for example, uniform resource locator (URL) reputations, blacklists, whitelists, anti-virus scanning, anti-malware techniques, and/or the like.

SUMMARY

According to some possible implementations, a security platform may include one or more processors to: determine, during receipt of a file, metadata associated with the file, where the file is intended for a client device; compute, based on the metadata and during the receipt of the file, a hash associated with the file; identify, during the receipt of the file, a stored hash that matches the hash associated with the file; determine a security classification of the file based on information associated with a security classification corresponding to the stored hash, where the security classification of the file is determined before the receipt of the file is complete; and selectively permit, based on the security classification of the file, the client device to complete a receipt of the file.

According to some possible implementations, a non-transitory computer-readable medium may store one or more instructions that, when executed by one or more processors, cause the one or more processors to: compute, during a receipt of a file and based on metadata associated with the file, a hash associated with the file, where the file is intended for a client device; identify, during the receipt of the file, a stored hash that matches the hash associated with the file; determine, before the receipt of the file is complete, a security classification of the file based on information associated with a security classification corresponding to the stored hash; and selectively permit, based on the security classification of the file, the client device to complete a receipt of the file.

According to some possible implementations, a method may include: determining, by a device and during receipt of a file, metadata associated with the file, where the file is intended for a client device; computing, by the device and during the receipt of the file, at least one hash associated with the file, where the at least one hash is computed based on the metadata; identifying, by the device and during the receipt of the file, a stored hash that matches one of the at least one hash associated with the file; determining, by the device, a security classification of the file based on information associated with a security classification corresponding to the stored hash, where the security classification of the file is determined before the receipt of the file is complete; and selectively causing, by the device and based on the security classification of the file, an entirety of the file to be provided to the client device.

DETAILED DESCRIPTION

The following detailed description of example implementations refers to the accompanying drawings. The same reference numbers in different drawings may identify the same or similar elements.

A security platform, configured to provide a threat protection service to a client device, may receive (e.g., from a server device and via a network device) a file that is also received by the client device. In order to provide the threat protection service to the client device, the security platform may analyze the file (e.g., using anti-virus software, using anti-malware software, etc.) and determine a security classification of the file based on a result of the analysis (e.g., indicating whether the file is a malicious file, a suspicious file, a clean file, and/or the like).

However, in order to ensure accurate determination of the security classification, the security platform may need to wait until receipt of the file is complete before determining the security classification. Thus, a cost (e.g., a temporal cost, a cost in network resources, a cost in processor resources, and/or the like) associated with determining security classifications of files may be undesirably high since the entirety of every file needs to be received before determining the security classification. Such costs may remain undesirably high even when security classifications, associated with received files, are stored for use at a later time since a later receipt of the file still must be complete before the security platform is able to determine whether the file has been previously classified. Moreover, in order to achieve in-line blocking that prevents an attack at the client device, the security classification of the file should be determined before receipt of the file is completed by the client device.

A uniform resource locator (URL), via which the file is requested by the client device, may not be relied upon for determination of the security classification, or even to identify the file. For example, since a single URL can serve multiple versions of the file (e.g., depending on the time of download), and/or can serve binaries targeted to different operating systems (e.g., based on request headers), the file received by the client device in association with the URL, may not be the same as a previously received file associated with the URL. Similarly, a portion of the file alone may not be used to reliably identify the file and/or determine the security classification since, for example, an attacker could inject malicious code in another portion of the file that is not analyzed by the security platform.

Some implementations described herein provide a security platform capable of determining a security classification of a file based on a hash associated with the file, before completing receipt of the file (i.e., before the security platform completes receipt of the file). In some implementations, the security platform may determine the security classification based on a hash store created, managed, maintained, or accessible by the security platform. Here, the security platform may compare the hash to stored hashes, included in the hash store and associated with previously received files, in order to determine the security classification of the file before completing receipt of the file. In some implementations, the hash-based determination of the security classification reduces a cost (e.g., a temporal cost, a cost in processor resources, a cost in network resources, and/or the like) associated with determining the security classification of the file and/or allows for in-line blocking associated with protecting the client device from malicious or suspicious files.

Figure 1A:
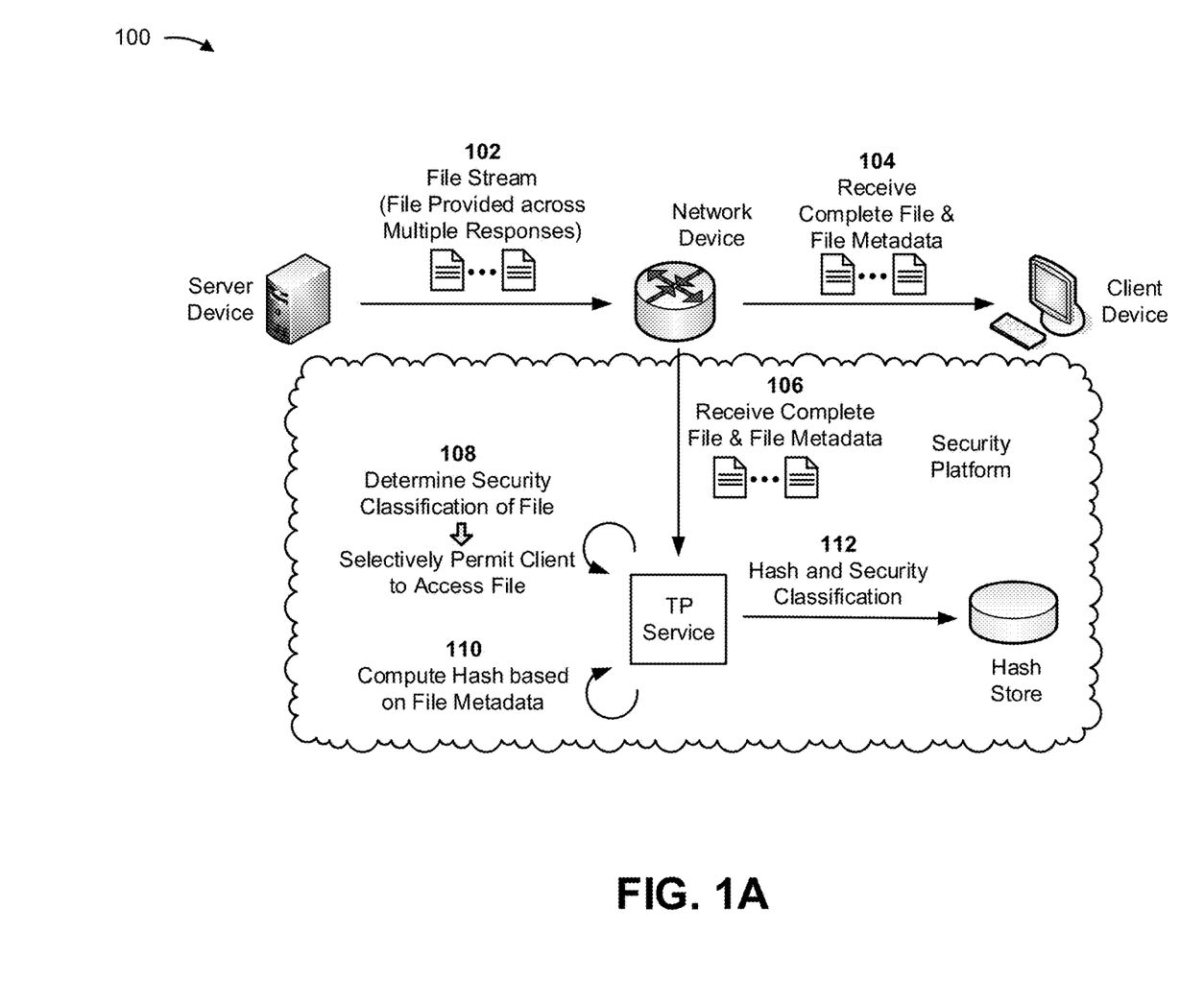
FIGS. 1A and 1B are diagrams of an overview of an example implementation described herein.
Figure 1B:
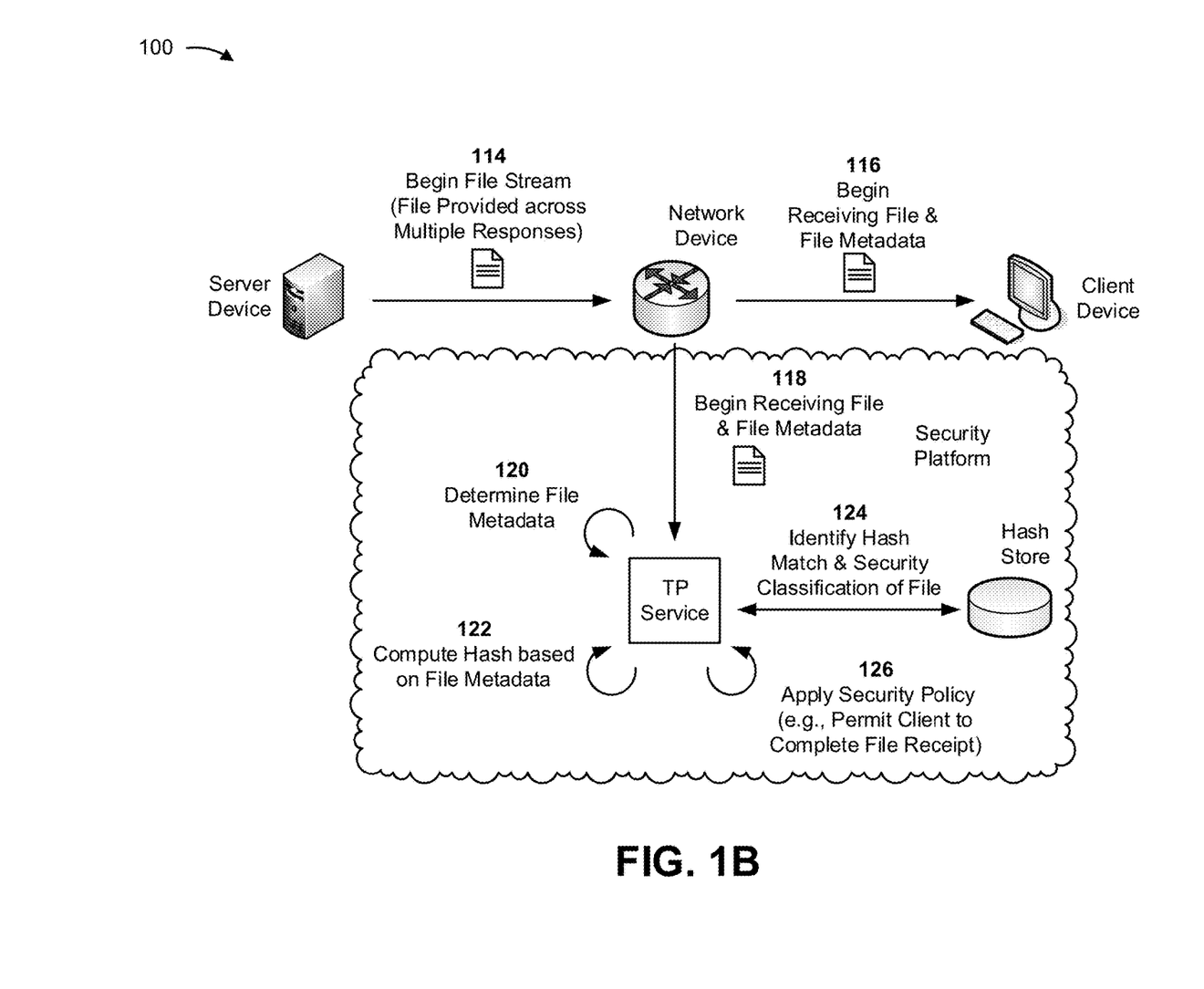

FIGS. 1A and 1B are diagrams of an overview of an example implementation 100 described herein. For the purposes of example implementation 100, a security platform is configured to provide a threat protection to a client device that is capable of communicating, via a network device, with a server device (e.g., a website server).

FIG. 1A is a diagram of the security platform creating a hash store to be used for determining security classifications of files, before completing receipt of the files. As shown in FIG. 1A, and by reference number 102, the server device may provide (e.g., based on a hypertext transfer protocol (HTTP) request provided by the client device via the network device) a file stream associated with a file to be received by the client device (e.g., a series of HTTP responses, each including a portion of the file). As shown by reference number 104, the network device may send the file stream, provided by the server device, to the client device such that the client device receives the complete file (including metadata associated with the file). As shown by reference number 106, the network device may mirror the file stream to the security platform (e.g., such that the security platform receives the complete file and the metadata associated with the file) in order to allow the security platform to provide the protection service.

As shown by reference number 108, the security platform may determine (e.g., based on analyzing the complete file) a security classification of the file. The security classification may include an indication of whether the file is a malicious file, a suspicious file, a clean file, and/or the like. As further shown, based on the security classification of the file the security platform may selectively permit the client device to access the file. For example, if the security platform classifies the file as a malicious file or a suspicious file, then the security platform may not permit (i.e., may prevent) the client device from opening the file, executing the file, manipulating the file, or the like. Conversely, if the security platform classifies the file as a clean file, then the security platform may permit the client device to open the file, execute the file, manipulate the file, or the like.

As shown by reference number 110, the security platform may also compute a hash, associated with the file, based on the metadata associated with the file. The metadata may include, for example, information included in one or more header fields of a response associated with the file (e.g., an entity tag (ETag) field, a Last-Modified field, a Content-Length field, and/or the like), a processed URL associated with the file (e.g., a URL from which one or more query parameters have been removed), address information associated with the file (e.g., a subnet or a range of an Internet protocol (IP) address associated with the file), and/or the like.

The hash may include a value (e.g., a string of alphanumeric characters) computed based on applying a hash function to the metadata associated with the file. In some implementations, the security platform may compute the hash based on concatenating one or more items of metadata associated with the file, as described below. Additionally, or alternatively, the security platform may compute the hash based on concatenating one or more items of metadata with a portion of the file included in the response, as described below.

As shown by reference number 112, the security platform may store the hash and information associated with security classification in a hash store created, managed, maintained, and/or accessible by the security platform. This process may be performed for other files, received by the security platform, in order to create the hash store. In some implementations, the security platform may use the hash store to determine a security classification of a file, during receipt of the file, at a later time, as described with regard to FIG. 1B.

FIG. 1B is a diagram of the security platform determining a security classification of a file, during receipt of the file (e.g., before completing receipt of the file), based on the hash store. As shown in FIG. 1B, and by reference number 114, the server device may begin providing a file, to be received by the client device, via a file stream. As shown by reference number 116, the network device may begin sending the file stream (e.g., may send a first HTTP response in the file stream), provided by the server device, to the client device such that the client device begins to receive the complete file (including metadata associated with the file). As shown by reference number 118, the network device may begin mirroring the file stream to the security platform (e.g., such that the security platform receives the first HTTP response and the associated metadata).

As shown by reference number 120, the security platform may determine, based on the beginning of the file stream (e.g., based on the first HTTP response) the metadata associated with the file (e.g., information included in one or more header fields, a processed URL associated with the file, address information associated with the file, and/or the like). As shown by reference number 122, the security platform may compute a hash, associated with the file, based on the metadata, during receipt of the file. Notably, while example implementation 100 is described in the context of computing the hash based on metadata associated with a single response, in some implementations, the security platform may compute the hash based on metadata associated with multiple responses (e.g., a first two responses in the file stream).

In some implementations, the security platform may determine, during receipt of the file, whether the hash associated with the file matches a stored hash included in the hash store. For example, as shown by reference number 124, the security platform may determine, using the hash store, that the hash associated with the file matches (e.g., is identical to) a stored hash associated with a previously received file. Here, the security platform may identify a security classification corresponding to the stored hash, and may determine the security classification of the file (i.e., the file being received) based on the identified security classification. In this way, the security platform may determine the security classification of the file before completing receipt of the file. In a case where the security platform determines, during receipt of the file, that the hash associated with the file does not match a stored hash included in the hash store, then the security platform may complete receipt of the file and proceed as described above with regard to FIG. 1A.

As shown by reference number 126, based on the security classification of the file, the security platform may apply a security policy by, for example, by selectively permitting the client device to complete receipt of the file (i.e., may perform in-line blocking, if needed). For example, if the security platform classifies the file as a malicious file or a suspicious file (e.g., based on information included in the hash store), then the security platform may not permit (i.e., may prevent) the client device to complete receipt of the file (e.g., by sending an instruction to the network device to block the file stream from being provided to the client device). Conversely, if the security platform classifies the file as a clean file, then the security platform may permit the client device to complete receipt of the file. In some implementations, the security platform may apply a security policy that causes the security platform to perform another type of action, such as providing a warning to the client device, causing another (i.e., alternate) file to be delivered to the client device, causing the client device to be directed to another device and/or site in order to obtain the file, and/or the like.

In this way, the security platform may determine a security classification of a file based on a hash associated with the file, before completing receipt of the file, thereby reducing a cost (e.g., a temporal cost, a cost in processor resources, a cost in network resources, and/or the like) associated with determining the security classification of the file and/or allowing for in-line blocking associated with protecting the client device from malicious or suspicious files.

As indicated above, FIGS. 1A and 1B are provided merely as an example. Other examples are possible and may differ from what was described with regard to FIGS. 1A and 1B.

Figure 2:
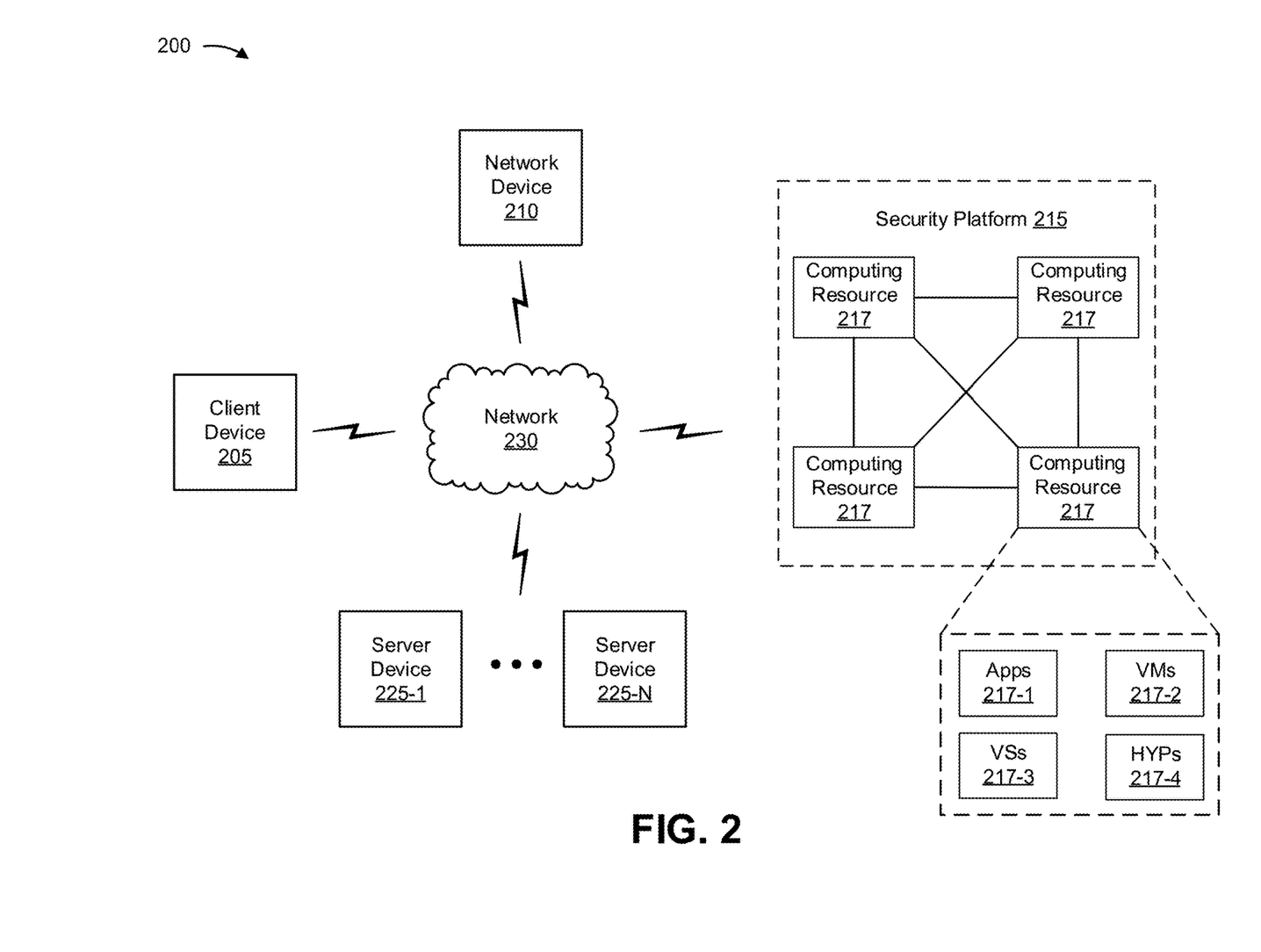
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 205, a network device 210, a security platform 215 (e.g., hosted in a cloud computing environment), one or more server devices 225-1 through 225-N (N≥1) (hereinafter referred to collectively as server devices 225, and individually as server device 225), and a network 230. Devices of environment 200 may interconnect via wired connections, wireless connections, or a combination of wired and wireless connections.

Client device 205 includes a device capable of communicating with another device (e.g., server device 225, another client device 205, and/or the like) via network device 210, in order to receive a file. For example, client device 205 may include a user device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device. As another example, client device 205 may include a server or a group of servers.

Network device 210 includes one or more devices (e.g., one or more traffic transfer devices) capable of processing and/or transferring traffic between client device 205 and another device (e.g., server device 225). For example, network device 210 may include a firewall, a router, a gateway, a switch, a hub, a bridge, a reverse proxy, a server (e.g., a proxy server), a security device, an intrusion detection device, a load balancer, or a similar device. In some implementations, network device 210 may be a physical device implemented within a housing, such as a chassis. In some implementations, network device 210 may be a virtual device implemented by one or more computer devices of a cloud computing environment or a data center.

Security platform 215 includes one or more devices capable of determining a security classification of a file based on a hash associated with the file, before completing receipt of the file (i.e., before the security platform completes receipt of the file), as described herein. For example, security platform 215 may include a server or a group of servers. In some implementations, security platform 215 may be hosted in a cloud computing environment. In some implementations, security platform 215 may operate in conjunction with a network device 210 arranged at an edge of a private network (e.g., that includes a plurality of client devices 205). In some implementations, security platform 215 may operate in conjunction with a plurality of network devices 210, which may provide security platform 215 with information related to files transmitted via the private network. Notably, while implementations described herein describe security platform 215 as being hosted in a cloud computing environment, in some implementations, security platform 215 may not be cloud-based or may be partially cloud-based.

In some implementations, security platform 215 may be hosted in a cloud computing environment that delivers computing as a service, whereby shared resources, services, etc. may be provided to host security platform 215. The cloud computing environment may provide computation, software, data access, storage, and/or other services that do not require end-user knowledge of a physical location and configuration of a system and/or a device that delivers the services. As shown, the cloud computing environment may include a group of computing resources 217 associated with hosting security platform 215.

Computing resource 217 includes one or more personal computers, workstation computers, server devices, or another type of computation and/or communication device. In some implementations, computing resource 217 may host security platform 215. The cloud resources may include compute instances executing in computing resource 217, storage devices provided in computing resource 217, data transfer devices provided by computing resource 217, etc. In some implementations, computing resource 217 may communicate with other computing resources 217 via wired connections, wireless connections, or a combination of wired and wireless connections.

As further shown in FIG. 2, computing resource 217 may include a group of cloud resources, such as one or more applications (APPs) 217-1, one or more virtual machines (VMs) 217-2, virtualized storage (VSs) 217-3, one or more hypervisors (HYPs) 217-4, or the like.

Application 217-1 includes one or more software applications that may be provided to or accessed by network device 210. Application 217-1 may eliminate a need to install and execute the software applications on network device 210. For example, application 217-1 may include software associated with security platform 215 and/or any other software capable of being provided via the cloud computing environment. In some implementations, one application 217-1 may send/receive information to/from one or more other applications 217-1, via virtual machine 217-2.

Virtual machine 217-2 includes a software implementation of a machine (e.g., a computer) that executes programs like a physical machine. Virtual machine 217-2 may be either a system virtual machine or a process virtual machine, depending upon use and degree of correspondence to any real machine by virtual machine 217-2. A system virtual machine may provide a complete system platform that supports execution of a complete operating system (OS). A process virtual machine may execute a single program, and may support a single process. In some implementations, virtual machine 217-2 may execute on behalf of a user (e.g., network device 210), and may manage infrastructure of the cloud computing environment, such as data management, synchronization, or long-duration data transfers.

Virtualized storage 217-3 includes one or more storage systems and/or one or more devices that use virtualization techniques within the storage systems or devices of computing resource 217. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 217-4 provides hardware virtualization techniques that allow multiple operating systems (e.g., guest operating systems) to execute concurrently on a host computer, such as computing resource 217. Hypervisor 217-4 may present a virtual operating platform to the guest operating systems, and may manage the execution of the guest operating systems. Multiple instances of a variety of operating systems may share virtualized hardware resources.

Server device 225 includes one or more devices capable of providing a file to client device 205 (e.g., via network device 210) via a file stream (e.g., in response to an HTTP request). For example, server device 225 may include a server, a group of servers, and/or the like.

Network 230 includes one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
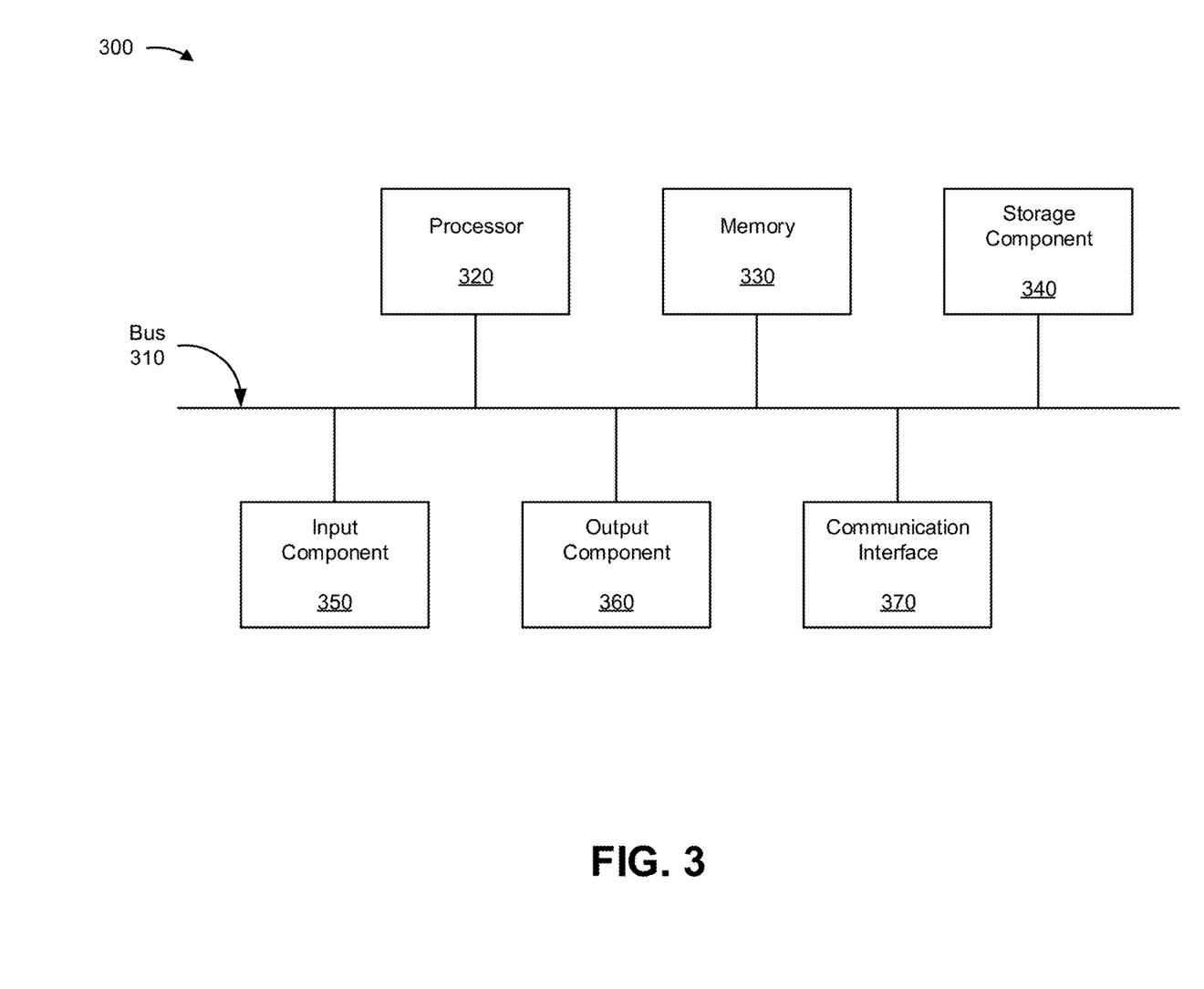
FIG. 3 is a diagram of example components of one or more devices of FIG. 2.

FIG. 3 is a diagram of example components of a device 300. Device 300 may correspond to client device 205, network device 210, security platform 215, computing resource 217, and/or server device 225. In some implementations, client device 205, network device 210, security platform 215, computing resource 217, and/or server device 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a WI-FI interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
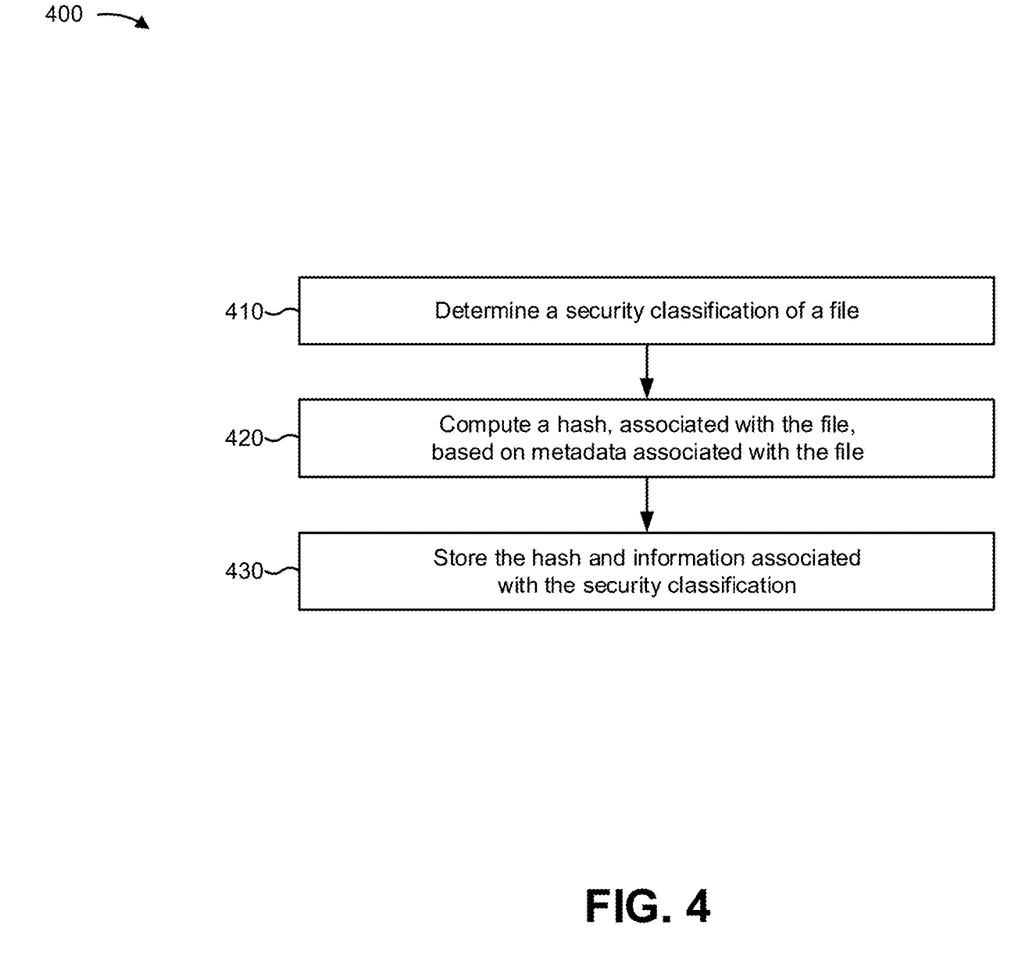
FIG. 4 is a flow chart of an example process for determining a security classification of a file, computing a hash based on metadata associated with the file, and storing the hash and information associated with the security classification.

FIG. 4 is a flow chart of an example process 400 for determining a security classification of a file, computing a hash based on metadata associated with the file, and storing the hash and information associated with the security classification. In some implementations, one or more process blocks of FIG. 4 may be performed by security platform 215. In some implementations, one or more process blocks of FIG. 4 may be performed by another device or a group of devices separate from or including security platform 215, such as network device 210 and/or client device 205.

As shown in FIG. 4, process 400 may include determining a security classification of a file (block 410). For example, security platform 215 may determine a security classification of a file. The file may include, for example, an executable file, a document file, an image file, a web page file, a text file, a page layout file, a compressed file, and/or another type of file.

In some implementations, security platform 215 may receive the file from server device 225 via network device 210. For example, client device 205 may send (e.g., based on user input), to server device 225 and via network device 210, a request (e.g., an HTTP request) for the file. Here, server device 225 may receive the request, and provide the file in a file stream (e.g., a series of HTTP responses, each including a portion of the file). In this example, network device 210 may be configured to mirror the file stream to security platform 215 (e.g., such that both client device 205 and security platform 215 receive the file stream) in order to allow security platform 215 to provide one or more threat protection services to client device 205 (e.g., one or more services associated with protecting client device 205 from malicious and/or suspicious files), and security platform 215 may receive the file via the mirrored file stream.

The security classification of the file may include information that classifies the file as a malicious file (e.g., a file that includes content that would be harmful to client device 205 if accessed by client device 205), a suspicious file (e.g., a file that includes content that may be harmful to client device 205 if accessed by client device 205), a clean file (e.g., a file that does not pose a risk to client device 205), and/or the like. Notably, while implementations are described herein are described in the context of security classifications (e.g., based on classifying a file as malicious, suspicious, or clean), in some implementations, another type of classification may be implemented in a similar manner in order to cause security platform 215 to selectively apply a security policy to receipt of a file by client device 205. For example, security platform 215 may be configured to classify a file as being acceptable or unacceptable based on, for example, whether a type of the file is permitted for use by client device 205 (e.g., when an entity wishes to prevent download of particular types of software that are not malicious). Here, security platform 215 may apply a security policy, associated with such a classification, in a manner similar to that described herein when based on a security classification of the file.

In some implementations, security platform 215 may determine the security classification of the file based on information associated with the file. For example, security platform 215 may complete receipt of the file via the file stream, may analyze the file (e.g., using anti-virus software, using anti-malware software, using sandboxing, etc.), and may determine the security classification of the file based on a result of the analysis. As a particular example, security platform 215 may determine, based on information associated with the file and using anti-malware software configured on security platform 215, a malware score associated with the file (e.g., a value from 0 to 100, a letter grade, and/or the like). In this example, security platform 215 may determine the security classification of the file based on whether the malware score satisfies a threshold. Here, if the malware score satisfies the threshold (e.g., is greater than or equal to the threshold), then security platform 215 may classify the file as a malicious or suspicious file. Conversely, if the malware score does not satisfy the threshold, then security platform 215 may classify the file as a clean file.

In some implementations, security platform 215 may determine the security classification in another manner, such as based on information that identifies known malicious and/or suspicious files (e.g., a list, accessible by security platform 215, that identifies known malicious and/or suspicious files), based on information provided by another device (e.g., when the other device determines the security classification of the file), and/or the like.

In some implementations, security platform 215 may selectively permit client device 205 to access the file based on the security classification. For example, if security platform 215 classifies the file as a malicious file or a suspicious file, then security platform 215 may not permit (i.e., prevent) client device 205 from accessing the file. In other words, although receipt of the file is completed by security platform 215 and client device 205, security platform 215 may prevent client device 205 from opening the file, executing file, manipulating the file, and/or the like. As another example, if security platform 215 classifies the file as a clean file, then security platform 215 may permit client device 205 to access the file.

As further shown in FIG. 4, process 400 may include computing a hash, associated with the file, based on metadata associated with the file (block 420). For example, security platform 215 may compute a hash, associated with the file, based on metadata associated with the file.

The metadata, associated with the file, may include information that describes one or more characteristics, attributes, parameters, and/or the like, associated with the file. In some implementations, the metadata may be received in a response included in the file stream associated with receiving the file. For example, the file stream may include a series of responses (e.g., HTTP responses) provided by server device 225, where each response includes a portion of the file. In this example, the metadata may be received in one or more of the responses, such as information included in one or more header fields of the one or more responses (e.g., an ETag field, a Last-Modified field, a Content-Length field, and/or the like). In some implementations, security platform 215 may determine the metadata based on inspecting one or more responses included in the file stream (e.g., a first response in the file stream, a tenth response in the file stream, a first four responses in the file stream, every third response in the file stream, and/or the like).

As another example, the metadata may include a URL associated with the file (e.g., a URL based on which client device 205 requested the file). In some implementations, security platform 215 may process the URL in order to remove one or more query parameters that may negatively impact computation of the hash. For example, security platform 215 may remove one or more query parameters that may change among URLs associated with requesting the file, such as a filename, a session ID, a language setting, a timestamp, and/or the like. In other words, security platform 215 may process the URL to remove query parameters that may cause different hashes to be computed for the same file at different times (e.g., such that security platform 215 may compute the hash based on query parameters that are not likely to change among URLs associated with requesting the file).

As another example, the metadata may include address information associated with the file, such as a subnet of an IP address of server device 225 that provided the file, a range of the IP address, and/or the like.

As another example, the metadata may include information associated with server device 225 that provided the file, such as information that identifies software running on server device 225, information that identifies a version of the server software, and/or another type of information associated with server device 225.

The hash (sometimes referred to as a hash value, a hash code, or a digest) may include a value (e.g., a string of alphanumeric characters) computed based on applying a hash function (e.g., a function used to map information of arbitrary size to information with a fixed size) to the metadata associated with the file.

In some implementations, security platform 215 may compute the hash based on applying the hash function to the metadata associated with the file. For example, security platform 215 may concatenate two or more items of metadata (e.g., the ETag field information, the Last-Modified field information, the Content-Length field information, the processed URL, the subnet associated with the IP address, the range associated with the IP address, and/or the like), apply the hash function to the two or more items of concatenated metadata, and determine the hash as a result of applying the hash function. In some implementations, security platform 215 may compute the hash based on a single item of metadata.

Additionally, or alternatively, security platform 215 may compute the hash based on a portion of the file. For example, as described above, security platform 215 may determine the metadata, associated with the file, based on a response included in the file stream. In this example, security platform 215 may identify the portion of the file included the response (since the response carries a portion of the file). Here, security platform 215 may compute the hash based on the portion of the file and the metadata by, for example, concatenating the portion of the file and one or more items of metadata, and applying the hash function to the concatenated portion of the file and the one or more items of metadata. In some implementations, computing the hash based on the portion of the file improves accuracy when determining whether another hash, computed during another receipt of the file at a later time, matches the hash, as described below.

In some implementations, security platform 215 may compute the hash based on a single response (e.g., based on metadata from a first response in the file stream, based on metadata and a portion of the file from a third response in the file stream, and/or the like). In some implementations, security platform 215 may compute the hash based on multiple responses (e.g., based on metadata from a first response and metadata from a second response in the file stream, based on metadata from a first response and a portion of the file from a second response, and/or the like).

In some implementations, security platform 215 may compute multiple hashes, associated with the file, based on different combinations of metadata and/or portions of the file. For example, security platform 215 may compute a first hash based on one or more first items of metadata (e.g., the ETag field information, the Last-Modified field information, and the URL), may compute a second hash based on one or more second items of metadata (e.g., the Content-length field and the subnet of the IP address), may compute a third hash based on one or more third items of metadata (e.g., the ETag field information) and a portion of the file included in the response, and/or the like. In some implementations, computing multiple hashes reduces a likelihood that another receipt of the file at a later time is missed or inaccurately identified by security platform 215, as described below.

In some implementations, security platform 215 may use one or more hashes to determine a security classification of the file at a later time, before another receipt of the file is complete, as described below.

As further shown in FIG. 4, process 400 may include storing the hash and information associated with the security classification (block 430). For example, security platform 215 may store the hash and information associated with the security classification.

In some implementations, security platform 215 may store the hash and the information associated with the security classification in a hash store managed, maintained, and/or accessible by security platform 215. In some implementations, security platform 215 may store information associating the hash with the security classification (e.g., such that the security classification of the file may be identified based on the hash).

In some implementations, security platform 215 may store another type of information associated with the hash, such as information that identifies the type of metadata based on which the hash was computed, information that identifies a response from which a portion of the file, based on which the hash was computed, was obtained (e.g., the first response in the file stream, the third response in the file stream), and/or the like.

In some implementations, security platform 215 may selectively store the hash and the information associated with the security classification based on reputation information associated with server device 225 that provides the file. For example, security platform 215 may store or have access to information that identifies (e.g., a site address or name, an IP address, and/or the like) trusted devices (i.e., a "white list" of server devices 225). In this example, if security platform 215 classifies the file as a clean file and server device 225 is a trusted device, then security platform 215 may store the hash and the information associated with the security classification. Conversely, if security platform 215 classifies the file as a suspicious file or a malicious file and server device 225 is a trusted device, then security platform 215 may not store the hash and the information associated with the security classification. In other words, when server device 225 that provided the file is a trusted device, then security platform 215 may be configured to store the hash only when the file is classified as a clean file.

As another example, security platform 215 may store or have access to information that identifies (e.g., a site name, an IP address, and/or the like) untrusted devices and/or websites (i.e., a "black list" of server devices 225 and/or websites). In this example, if security platform 215 classifies the file as a clean file and server device 225 is an untrusted device, then security platform 215 may not store the hash and the information associated with the security classification. Conversely, if security platform 215 classifies the file as a suspicious file or a malicious file and server device 225 is an untrusted device, then security platform 215 may store the hash and the information associated with the security classification. In other words, when server device 225 that provided the file is an untrusted device, then security platform 215 may be configured to store the hash only when the file is classified as a malicious or suspicious file.

In some implementations, selectively storing the hash based on the information associated with server device 225 may increase accuracy when determining whether another hash (e.g., computed during receipt of a file at a later time) matches the hash and/or may serve to ensure that the hash store includes accurate security classifications.

In some implementations, security platform 215 may store the hash and information associated with the security classification in order to allow security platform 215 to determine the security classification of the file during another receipt of the file (i.e., before completing the other receipt of the file), as described below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
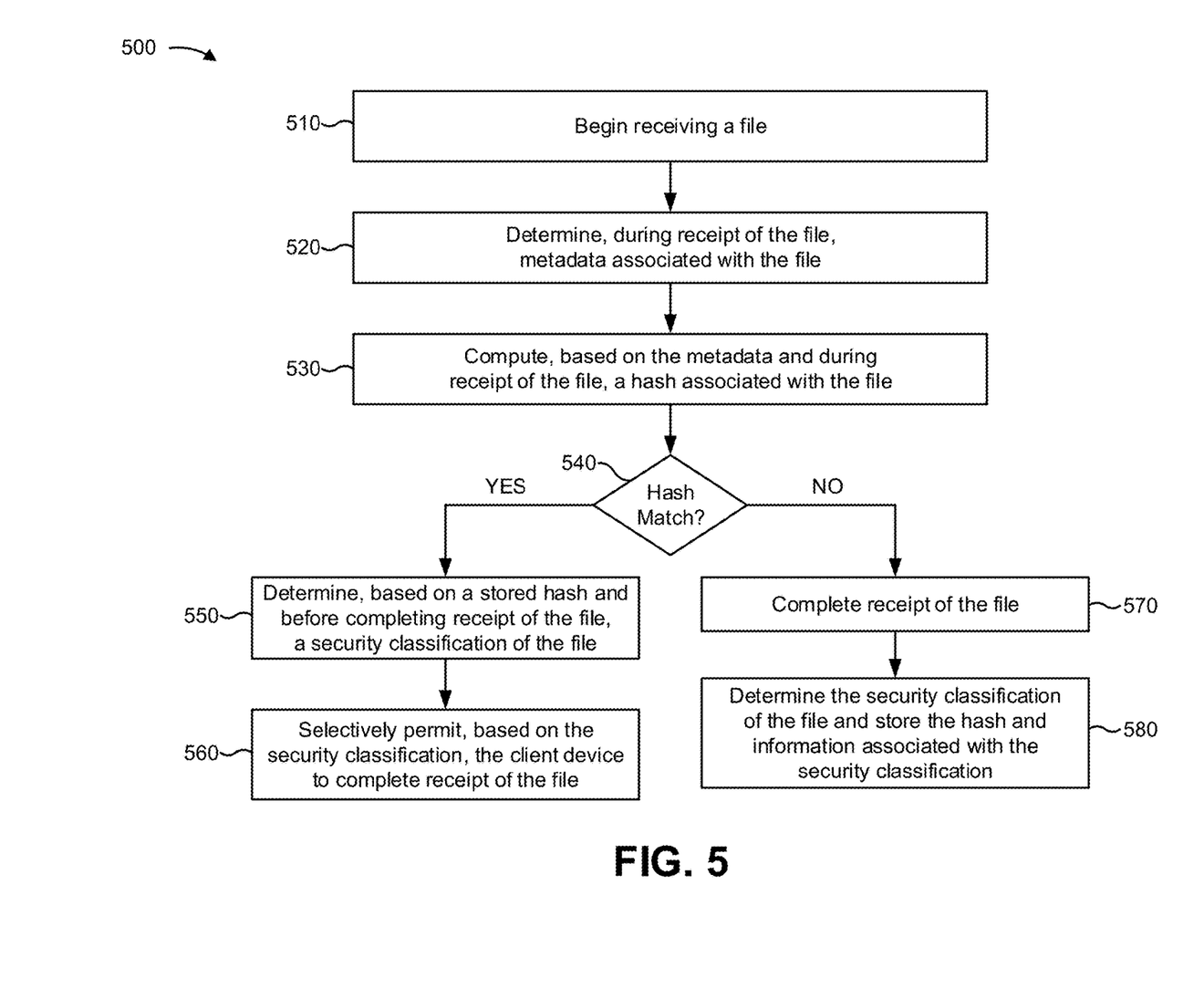
FIG. 5 is a flow chart of an example process for determining a security classification of a file, based on a hash associated with the file, before completing receipt of the file.

FIG. 5 is a flow chart of an example process 500 for determining a security classification of a file, based on a hash associated with the file, before completing receipt of the file. In some implementations, one or more process blocks of FIG. 5 may be performed by security platform 215. In some implementations, one or more process blocks of FIG. 5 may be performed by another device or a group of devices separate from or including security platform 215, such as network device 210 and/or client device 205.

As shown in FIG. 5, process 500 may include beginning receiving a file (block 510). For example, security platform 215 may begin receiving a file.

In some implementations, security platform 215 may begin receiving the file in a file stream mirrored by network device 210. For example, client device 205 may send (e.g., based on user input), to server device 225 and via network device 210, a request (e.g., an HTTP request) for the file. Here, server device 225 may receive the request, and provide the file in a file stream (e.g., a series of HTTP responses, each including a portion of the file). In this example, network device 210 may be configured to mirror the file stream to security platform 215 in order to allow security platform 215 to provide one or more threat protection services to client device 205, and security platform 215 may begin receiving the file via the mirrored file stream.

As further shown in FIG. 5, process 500 may include determining, during receipt of the file, metadata associated with the file (block 520). For example, security platform 215 may determine, during receipt of the file, metadata associated with the file.

In some implementations, security platform 215 may determine the metadata, associated with the file, based on one or more responses in the file stream. For example, security platform 215 may receive a response (e.g., a first response) in the file stream, and may determine, based on the response, information included in one or more header fields (e.g., an ETag field, a Last-Modified field, a Content-Length field, and/or the like), a processed URL, address information (e.g., a subnet or a range of an IP address of server device 225), and/or the like, as described above. In some implementations, security platform 215 may also identify the portion of the file included in the response (e.g., when security platform 215 is configured to compute hashes based in part on the portion of the file in the first response), as described above.

Notably, security platform 215 determines the metadata, associated with the file, during receipt of the file (i.e., before receipt of the file is complete). As described below, this may allow security platform 215 to determine the security classification of the file before receipt of the file is complete.

As further shown in FIG. 5, process 500 may include computing, based on the metadata and during receipt of the file, a hash associated with the file (block 530). For example, security platform 215 may compute, based on the metadata and during receipt of the file, a hash associated with the file. In some implementations, security platform 215 may compute the hash in the manner described above with regard to process 400.

Notably, security platform 215 computes the hash, associated with the file, during receipt of the file (i.e., before receipt of the file is complete). As described below, this may allow security platform 215 to determine the security classification of the file before receipt of the file is complete.

As further shown in FIG. 5, process 500 may include determining whether the hash, associated with the file, matches a stored hash (block 540). For example, security platform 215 may determine whether the hash, associated with the file, matches a stored hash.

In some implementations, security platform 215 may determine whether the hash, associated with the file, matches a stored hash (e.g., a hash stored in the hash store) based on searching the hash store. For example, security platform 215 may search the hash store using the hash. Here, if the hash store includes an entry with an identical hash, then security platform 215 may determine that the hash matches a stored hash. Alternatively, if the hash store does not include an entry with an identical hash, then security platform 215 may determine that the hash does not match a stored hash. In some implementations, security platform 215 may determine that the hash is a fuzzy match with a stored hash (e.g., not identical, but matching within a threshold). In other words, in some implementations, security platform 215 may determine that the hash matches a stored hash even when there is only a partial match between the hash and the stored hash.

In some implementations, when security platform 215 computes multiple hashes associated with the file (e.g., based on different combinations of items of metadata), security platform 215 may determine whether each of the multiple hashes matches a stored hash. In some implementations, security platform 215 may be configured to identify a hash match when security platform 215 determines that any one of the multiple hashes matches a stored hash. Additionally, or alternatively, security platform 215 may be configured to identify a hash match when security platform 215 determines that a threshold number of the multiple hashes are matched in the hash store (e.g., when a majority of the multiple hashes are matched in the hash store). Additionally, or alternatively, security platform 215 may be configured to identify a hash match when each of the multiple hashes are matched in the hash store.

Notably, security platform 215 determines whether there exists a hash match during receipt of the file (i.e., before receipt of the file is complete). As described below, this may allow security platform 215 to determine the security classification of the file before receipt of the file is complete.

As further shown in FIG. 5, if the hash, associated with the file, matches a stored hash (block 540—YES), then process 500 may include determining, based on the stored hash and before completing receipt of the file, a security classification of the file (block 550). For example, security platform 215 may determine that the hash, associated with the file, matches a stored hash, and may determine, based on the stored hash and before completing receipt of the file, a security classification of the file.

In some implementations, security platform 215 may determine the security classification of the file based on information associated with the stored hash that matches the hash associated with the file. For example, as described above, the hash store may include hashes, associated with received files, and corresponding security classifications associated with the received files. Here, if security platform 215 determines that the hash of the file (being received via the file stream) matches a stored hash, then security platform 215 may determine the security classification of the file as a security classification associated with the stored hash. In some implementations, as described above, the security classification of the file may indicate that the file is a malicious file, a suspicious file, a clean file, and/or the like.

Notably, security platform 215 determines the security classification of the file during receipt of the file (i.e., before receipt of the file is complete). Here, security platform 215 determines the security classification of the file without completing receipt of the file, thereby decreasing an amount of time associated with classifying the file (e.g., as compared to waiting to complete receipt of the file). Moreover, in a case where the file is a malicious file or a suspicious file, security platform 215 may prevent client device 205 from completing receipt of the file, thereby conserving network resources and/or client device 205 resources (e.g., processor resources, memory, and/or the like), while improving a threat protection service provided to client device 205 (e.g., since client device 205 does not receive the complete file, there is no risk of client device 205 opening, executing, or otherwise manipulating the file before security platform 215 prevents client device 205 from accessing the file).

As further shown in FIG. 5, process 500 may include selectively permitting, based on the security classification, a client device to complete receipt of the file (block 560). For example, security platform 215 may selectively permit, based on the security classification, client device 205 to complete receipt of the file.

In some implementations, security platform 215 may selectively permit client device 205 to complete receipt of the file based on the security classification. For example, if security platform 215 determines, based on the stored hash, that the file is a malicious file or a suspicious file, then security platform 215 may not permit (i.e., prevent) client device 205 to complete receipt of the file. As a particular example, security platform 215 may stop, close, interrupt, and/or the like, the file stream via which client device 205 is receiving the file by client device 205 by, for example, sending an instruction to network device 210 to stop, close, interrupt, and/or the like, the file stream. As described above, preventing client device 205 from completing receipt of the file may conserve network resources and/or client device 205 resources, while improving the threat protection service provided to client device 205. As another example, if security platform 215 determines, based on the stored hash, that the file is a clean file, then security platform 215 may permit client device 205 to complete receipt of the file.

As further shown in FIG. 5, if the hash, associated with the file, does not match a stored hash (block 540—NO), then process 500 may include completing receipt of the file (block 570). For example, security platform 215 may determine that the hash, associated with the file, does not match a stored hash, and may complete receipt of the file via the file stream.

As further shown in FIG. 5, process 500 may include determining the security classification of the file and storing the hash and information associated with the security classification (block 580). For example, security platform 215 may determine the security classification of the file and store the hash and information associated with the security classification, in a manner similar to that described above with regard to FIG. 4.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations described herein provide a security platform capable of determining a security classification of a file based on a hash associated with the file, before completing receipt of the file (i.e., before the security platform completes receipt of the file). In some implementations, the hash-based determination of the security classification reduces a cost (e.g., a temporal cost, a cost in processor resources, a cost in network resources, and/or the like) associated with determining the security classification of the file and/or allows for in-line blocking associated with protecting the client device from malicious or suspicious files.

The foregoing disclosure provides illustration and description, but is not intended to be exhaustive or to limit the implementations to the precise form disclosed. Modifications and variations are possible in light of the above disclosure or may be acquired from practice of the implementations. For example, while some implementations, described herein, are described in the context of HTTP requests and responses, implementations using another protocol may be possible, such as HTTP secure (HTTPS) or another type of communications protocol.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A security platform, comprising:
   a memory; and
   one or more processors to:
      determine, during a receipt of a file, metadata associated with the file,
         the file being intended for a client device;
      compute, based on the metadata and during the receipt of the file, a hash associated with the file,
         the metadata including information from a header field of a response associated with the file;
      identify, during the receipt of the file, a stored hash,
         the stored hash being associated with a previously received file and corresponding to a security classification of the previously received file;
      compare the computed hash, associated with the file, with the stored hash associated with the previously received file;
      determine a security classification of the file based on comparing the computed hash, associated with the file, with the stored hash associated with the previously received file,
         the security classification of the file being determined before the security platform completes the receipt of the file; and
      selectively permit or not permit, based on the security classification of the file, the client device to complete the receipt of the file,
         the security platform being separate from the client device.

2. The security platform of claim 1, where the one or more processors are further to:
   concatenate two or more items of metadata included in the metadata associated with the file; and
   where the one or more processors, when computing the hash associated with the file, are to:
      compute the hash using the concatenated two or more items of metadata.

3. The security platform of claim 1, where the one or more processors are further to:
   identify a portion of the file; and
   where the one or more processors, when computing the hash associated with the file, are to:
      compute the hash further based on the portion of the file.

4. The security platform of claim 1, where the information from the header field includes information from at least one of:
   an entity tag field of the header;
   a last-modified field of the header; or
   a content-length field of the header.

5. The security platform of claim 1, where the one or more processors are further to:
   determine a security classification of the previously received file;
   compute a hash, associated with the previously received file, based on metadata associated with the previously received file; and
   store the hash, associated with the previously received file, and information associated with the security classification of the previously received file,
      the hash, associated with the previously received file, being the stored hash.

6. The security platform of claim 5, where the one or more processors, when storing the hash associated with the previously received file and the information associated with the security classification of the previously received file, are to:
   determine reputation information associated with a server device that provided the previously received file; and
   store the hash, associated with the previously received file, and the information associated with the security classification of the previously received file based on the reputation information.

7. The security platform of claim 1, where the security classification of the file is determined after a portion of the file is received and before the receipt of the file by the security platform is complete.

8. A non-transitory computer-readable medium storing instructions, the instructions comprising:
   one or more instructions that, when executed by one or more processors of a security platform, cause the one or more processors to:
      compute, during a receipt of a file and based on metadata associated with the file, a hash associated with the file,
         the file being intended for a client device;
      identify, during the receipt of the file, a stored hash,
         the stored hash being associated with a previously received file and corresponding to a security classification of the previously received file;
      compare the computed hash, associated with the file, with the stored hash associated with the previously received file;
      determine, before the security platform completes the receipt of the file, a security classification of the file based on comparing the computed hash, associated with the file, with the stored hash associated with the previously received file; and
      selectively permit or not permit, based on the security classification of the file, the client device to complete the receipt of the file,
         the security platform being separate from the client device.

9. The non-transitory computer-readable medium of claim 8, where the one or more instructions, when executed by the one or more processors, further cause the one or more processors to:
   concatenate two or more items of metadata included in the metadata associated with the file; and
   where the one or more instructions, that cause the one or more processors to compute the hash associated with the file, cause the one or more processors to:
      compute the hash based on the concatenated two or more items of metadata.

10. The non-transitory computer-readable medium of claim 8, where the one or more instructions, when executed by the one or more processors, further cause the one or more processors to:
    identify a portion of the file; and
    where the one or more instructions, that cause the one or more processors to compute the hash associated with the file, cause the one or more processors to:
        compute the hash further based on the portion of the file.

11. The non-transitory computer-readable medium of claim 8, where the one or more instructions, when executed by the one or more processors, further cause the one or more processors to:
    determine a security classification of the previously received file;
    compute a hash, associated with the previously received file, based on metadata associated with the previously received file; and
    store the hash, associated with the previously received file, and information associated with the security classification of the previously received file,
        the hash, associated with the previously received file, being the stored hash.

12. The non-transitory computer-readable medium of claim 11, where the one or more instructions, that cause the one or more processors to store the hash associated with the previously received file and the information associated with the security classification, cause the one or more processors to:
    determine reputation information associated with a server device that provided the previously received file; and
    selectively store the hash, associated with the previously received file, and the information associated with the security classification based on the reputation information.

13. A method, comprising:
    determining, by a device and during a receipt of a file, metadata associated with the file,
        the file being intended for a client device;
    computing, by the device and during the receipt of the file, at least one hash associated with the file,
        the at least one hash being computed based on the metadata;
    identifying, by the device and during the receipt of the file, a stored hash,
        the stored hash being associated with a previously received file and corresponding to a security classification of the previously received file;
    comparing, by the device, the at least one hash, associated with the file, with the stored hash associated with the previously received file;
    determining, by the device, a security classification of the file based on comparing the at least one hash, associated with the file, with the stored hash associated with the previously received file,
        the security classification of the file being determined before the device completes the receipt of the file; and
    selectively causing or not causing, by the device and based on the security classification of the file, an entirety of the file to be provided to the client device, the device being separate from the client device.

14. The method of claim 13, where the at least one hash includes a first hash and a second hash, and where computing the at least one hash associated with the file comprises:
    computing the first hash based on a first set of metadata included in the metadata associated with the file; and
    computing the second hash based on a second set of metadata included in the metadata associated with the file,
        the second set of metadata being different from the first set of metadata.

15. The method of claim 13, further comprising:
    identifying a portion of the file; and
    where computing the at least one hash associated with the file comprises:
        computing one of the at least one hash based on the portion of the file.

16. The method of claim 13, where the metadata includes information from a header field of a response associated with the file; and
    where the information from the header field includes at least one of:
        information from an entity tag field of the header;
        information from a last-modified field of the header; or
        information from a content-length field of the header.

17. The method of claim 13, further comprising:
    determining a security classification of the previously received file;
    computing a hash, associated with the previously received file, based on metadata associated with the previously received file; and
    selectively storing the hash, associated with the previously received file, and information associated with the security classification of the previously received file,
        the hash, associated with the previously received file, being the stored hash.

18. The method of claim 17, where selectively storing the hash associated with the previously received file and the information associated with the security classification comprises:
    determining reputation information associated with a server device that provided the previously received file,
        the reputation information indicating whether the server device is a trusted device; and
    storing, based on the reputation information, the hash, associated with the previously received file, and the information associated with the security classification.

19. The method of claim 17, where selectively storing the hash associated with the previously received file and the information associated with the security classification comprises:
    determining reputation information associated with a server device that provided the previously received file,
        the reputation information indicating whether the server device is a trusted device; and
    discarding, based on the reputation information, the hash, associated with the previously received file, and the information associated with the security classification.

20. The method of claim 13, where the security classification of the file is determined after a portion of the file is received and before the receipt of the file by the device is complete.

* * * * *